United States Patent [19]

Mundt et al.

[11] Patent Number: 4,479,587

[45] Date of Patent: Oct. 30, 1984

[54] TWO-WAY RUPTURABLE PRESSURE RELIEF APPARATUS

[75] Inventors: Arnold L. Mundt; Charles E. Beair, both of Tulsa, Okla.

[73] Assignee: BS&B Safety Systems, Inc., Tulsa, Okla.

[21] Appl. No.: 529,363

[22] Filed: Sep. 6, 1983

[51] Int. Cl.³ .............................................. F16K 17/40
[52] U.S. Cl. ................................. 220/89 A; 137/68 R
[58] Field of Search ..................... 220/89 A, 360, 367; 137/68 R, 70

[56] References Cited

U.S. PATENT DOCUMENTS

| | | | |
|---|---|---|---|
| 2,954,897 | 10/1960 | Hansen et al. | 220/89 A |
| 3,881,629 | 5/1975 | Shaw et al. | 220/89 A |
| 3,922,767 | 12/1975 | Solter et al. | 220/89 A X |
| 4,079,854 | 3/1978 | Shaw et al. | 220/89 A |
| 4,119,236 | 10/1978 | Shaw et al. | 220/89 A |
| 4,342,988 | 8/1982 | Thompson et al. | 220/89 A X |
| 4,434,905 | 3/1984 | Ou et al. | 137/68 R X |

Primary Examiner—Steven M. Pollard
Attorney, Agent, or Firm—C. Clark Dougherty, Jr.

[57] ABSTRACT

A two-way rupturable pressure relief apparatus adapted to be clamped between a pair of connection members connecting first and second pressure zones is provided. The apparatus is comprised of a rupture member including a plurality of openings therein, a support member including one or more arcuate slots defining a circular blowout portion and a hinge portion connected to the blowout portion therein positioned adjacent the rupture member and a flexible sealing member positioned adjacent the side of the support member opposite the rupture member. The sealing member is adhered to the support member whereby during the operation of the apparatus, the support member and the sealing member function as a single part and the sealing member is prevented from flexing except in the areas of the one or more arcuate slots in the support member.

10 Claims, 10 Drawing Figures

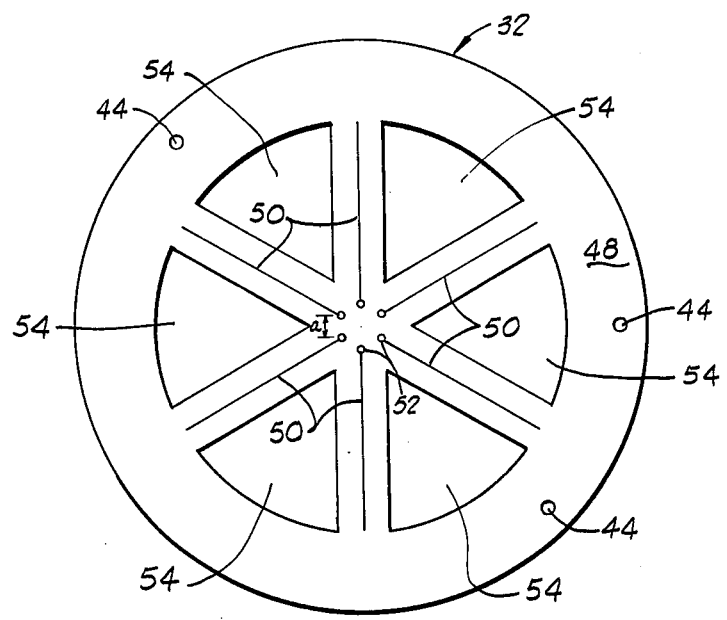
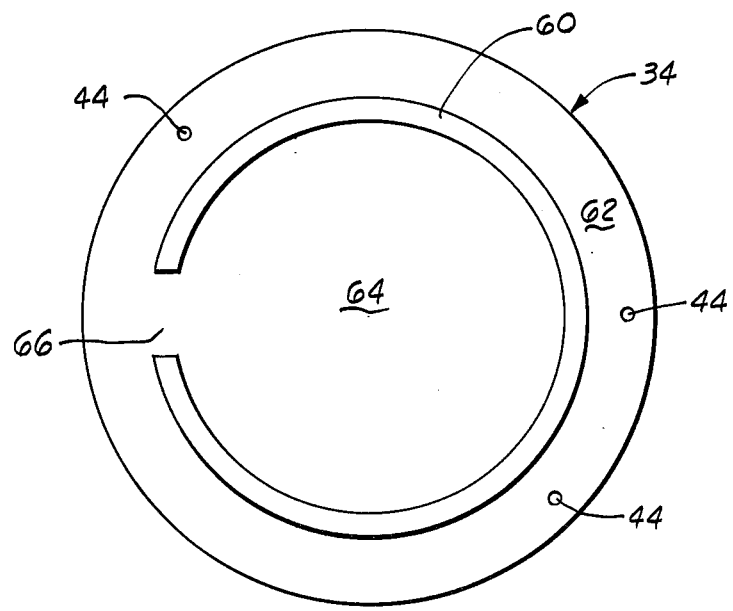
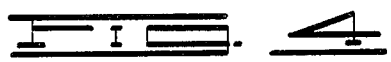

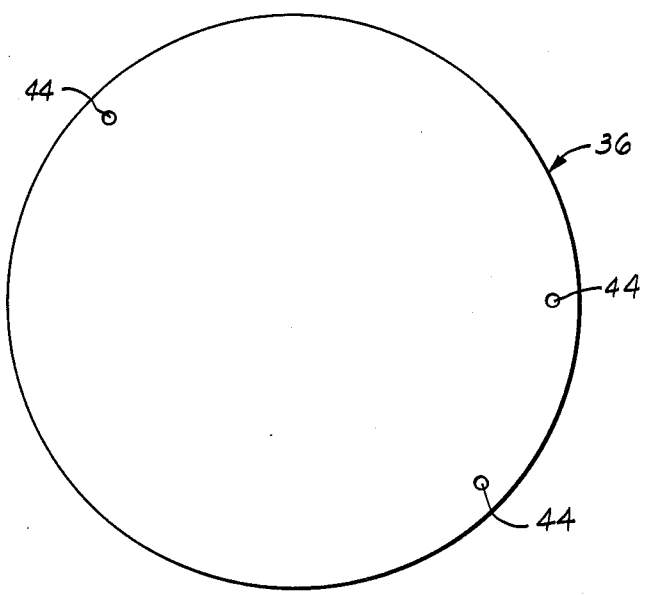
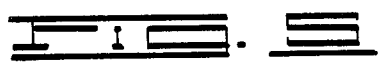
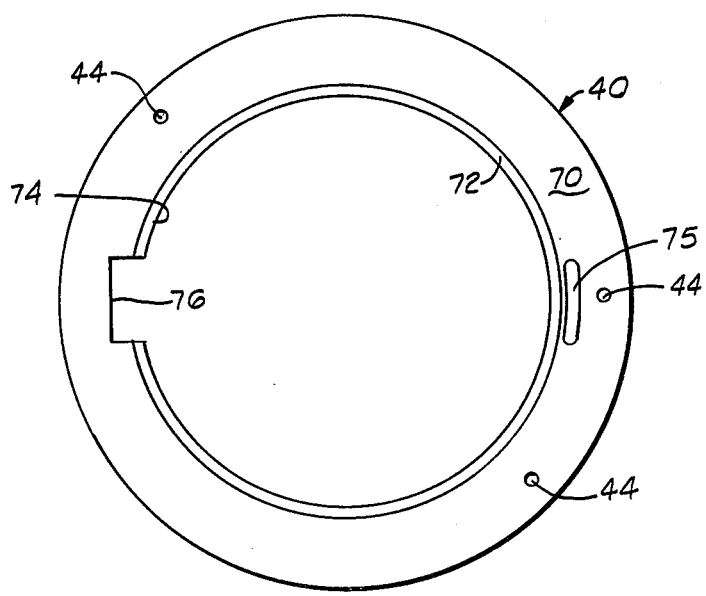
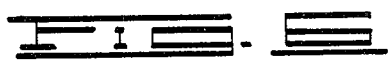

TWO-WAY RUPTURABLE PRESSURE RELIEF APPARATUS

BACKGROUND OF THE INVENTION

1. Field of the Invention

The present invention relates generally to the field of rupturable pressure relief apparatus, and more particularly, but not by way of limitation, to an improved rupturable pressure relief apparatus capable of relieving pressurized fluids in either direction between two pressure zones.

2. Description of the Prior Art

Rupturable pressure relief devices have been developed and used heretofore. Generally, such devices include a rupture disk supported between a pair of supporting members or flanges which are in turn connected to a relief connection in a vessel or system containing pressurized fluid. When the pressure within the vessel or system exceeds the design rupture pressure of the disk, rupture occurs causing pressurized fluids to be relieved from the vessel or system.

Two-way rupturable pressure relief apparatus have also been developed and used heretofore. Examples of such apparatus are described in U.S Pat. Nos. 4,278,181 issued July 14, 1981 to Wood et al. and 4,079,854 issued March 24, 1978 to Shaw et al. Such two-way rupturable pressure relief apparatus are connected between first and second pressure zones, e.g., between a pressure vessel containing a pressurized fluid and the atmosphere, between two vessels containing pressurized fluids at different pressure levels, etc. When the pressure differential exerted on the apparatus in either direction exceeds the pressure differential at which the apparatus is designed to rupture, rupture occurs and pressure is relieved by pressurized fluids flowing through the apparatus from one zone to the other zone.

The most common application of two-way rupturable pressure relief apparatus is where the apparatus protects a vessel or system against overpressure in the normal direction, i.e., from the vessel or system to the atmosphere or to a second vessel or system maintained at a lower pressure, and against excessive vacuum in the reverse direction. The term "normal direction" is used herein to mean the direction through the rupturable pressure relief apparatus whereby a fluid under relatively high pressure is relieved to the atmosphere or other relatively low pressure zone. The term "reverse direction" is used to mean the direction through the apparatus whereby a fluid under relatively low pressure, e.g., air at atmospheric pressure, is relieved to a zone at a lower pressure level, e.g., a vessel under vacuum.

Prior two-way rupturable pressure relief apparatus have been used successfully in applications where the differential between the pressure at which the apparatus must rupture in the normal direction and the pressure at which the apparatus must rupture in the reverse direction is low, e.g., 50 psi in the normal direction and 5 psi in the reverse direction. However, problems have been encountered in the use of prior two-way pressure relief apparatus where the differential between normal and reverse direction rupture is very high, e.g., 150 psi in the normal direction and 3 inches of water column in the reverse direction.

Another problem which has been encountered with prior two-way pressure relief apparatus involves the cleaning of the apparatus. Prior devices have included very fragile parts which are required to obtain rupture at low pressures in the reverse direction and which are difficult to clean without damaging the parts. In the food and beverage processing industry and other industries, the cleaning of rupturable apparatus is best accomplished with the apparatus still installed in its normal operating location. This type of cleaning is referred to as "cleaning in place". Cleaning in place is either impossible or difficult to accomplish with prior two-way rupturable pressure relief apparatus because of the design of the apparatus. Often, the apparatus are formed of a number of parts whereby more than one part surface is exposed to the process media making cleaning difficult and making it possible for substances from the process to collect between overlapping layers, etc. Generally, the prior art devices have had to be removed and taken apart in order to be cleaned and the fragile parts of the devices have had to be replaced each time.

By the present invention, an improved two-way rupturable pressure relief apparatus is provided which is particularly suitable for use in applications where very high pressure differentials between the normal rupture direction and reverse rupture direction are required. In addition, the apparatus of the present invention has a minimum number of parts, the various parts are flat and, other than a structure which includes a large central opening, the surface of only one part is exposed to the process side of the apparatus making the apparatus particularly suitable for being cleaned in place.

SUMMARY OF THE INVENTION

A two-way rupturable pressure relief apparatus adapted to be clamped between a pair of complementary connection members connecting first and second pressure zones is provided. The apparatus includes a rupture member having a plurality of openings therein and a support member including one or more arcuate slots defining a circular blowout portion and a hinge portion connected to the blowout portion therein positioned adjacent the rupture member. A flexible sealing member is positioned adjacent the side of the support member opposite the rupture member. The sealing member is adhered to the support member whereby during the operation of the apparatus, the support member and sealing member function as one part and the sealing member is prevented from flexing except in the areas of the one or more arcuate slots in the support member.

It is, therefore, a general object of the present invention to provide an improved two-way rupturable pressure relief apparatus.

A further object of the present invention is the provision of a two-way rupturable pressure relief apparatus which is particularly suitable for applications wherein high differentials are required between the rupture pressure in the normal direction and the rupture pressure in the reverse rupture direction.

Another object of the present invention is the provision of a two-way rupturable pressure relief apparatus which includes a minimum number of parts and which is particularly suitable for cleaning in place.

Still a further object of the present invention is the provision of a two-way rupturable pressure relief apparatus which provides a relatively large pressure relief flow area in both directions.

Other and further objects, features and advantage of the present invention will be readily apparent to those skilled in the art upon a reading of the description of preferred embodiments which follows when taken in conjunction with the accompanying drawings.

BRIEF DESCRIPTION OF THE DRAWINGS

FIG. 3 is a top plan view of one form of the rupture member of the apparatus of the present invention.

FIG. 4 is a top plan view of one form of the support member of the present invention.

FIG. 5 is a top plan view of the flexible sealing member of the present invention.

FIG. 6 is a top plan view of one form of the knife member of the present invention.

DESCRIPTION OF PREFERRED EMBODIMENTS

Figure 1:
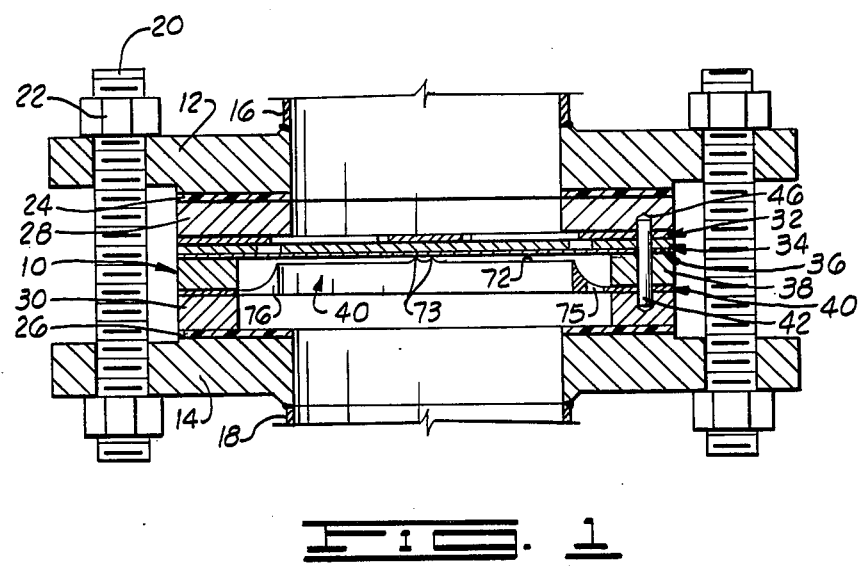
FIG. 1 is a sectional elevation view of apparatus of the present invention shown clamped between a pair of conventional flanges.
Figure 2:
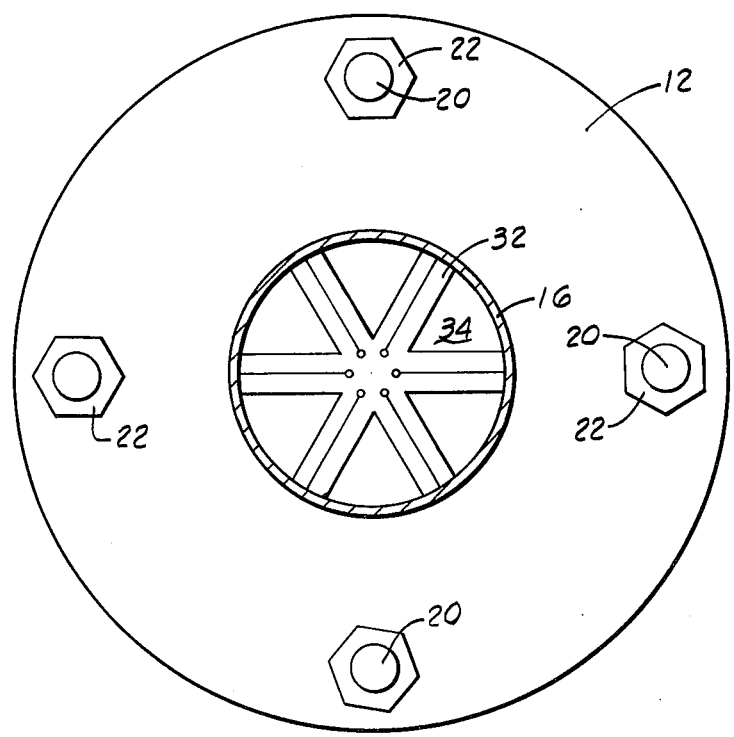
FIG. 2 is a top plan view of the apparatus illustrated in FIG. 1.

Referring now to the drawings and particularly to FIGS. 1 through 6, one embodiment of the apparatus of the present invention is illustrated and generally designated by the numeral 10. The apparatus 10 is shown clamped between a pair of flanges 12 and 14 which are in turn attached by conduits 16 and 18 to first and second pressure zones (not shown), respectively. The flanges 12 and 14 are maintained in a clamped position with the apparatus 10 sealingly held therebetween by a plurality of studs 20 and nuts 22. As will be understood by those skilled in the art, in addition to the flanges illustrated in the drawings, the apparatus 10 can be adapted to fit in angular seat holder rings as well as in the sanitary fittings utilized in the food and beverage processing industry.

A pair of conventional annular gaskets 24 and 26 are disposed between the annular seating surfaces of the flanges 12 and 14 and the apparatus 10 to insure a seal therebetween. In the embodiment illustrated, the apparatus 10 includes a pair of supporting rings 28 and 30 positioned adjacent the gaskets 24 and 26. Clamped between the supporting rings 28 and 30 is a rupture member 32, a support member 34, a flexible sealing member 36, a spacing ring 38 and a knife member 40.

In the embodiment shown in the drawings, the supporting ring 28 has a smaller internal diameter than the spacing ring 38 and the supporting ring 30. This arrangement provides an annular supporting surface for the members 32, 34 and 36 when force is exerted thereon towards the flange 12 (from the second zone towards the first zone). Also, the larger internal diameters of the spacing ring 38 and supporting ring 30 allow the knife member 40 to be of an internal diameter greater than the internal diameters of the flanges 12 and 14 which in turn allows the apparatus 10 to be full opening as will be described hereinbelow.

The various component parts of the apparatus 10 are required to be assembled and are maintained in proper alignment and orientation with respect to each other by three upstanding posts 42 which are attached to one of the supporting rings and which fit into recesses in the other supporting ring. In the embodiment shown in FIG. 1, the posts 42 are attached to the supporting ring 30 and fit into recesses 46 in the supporting ring 28. The posts 42 extend through apertures 44 in the various parts of the apparatus 10 positioned between the supporting rings 28 and 30. As best shown in FIGS. 3-6, the posts 42, apertures 44 and recesses 46 are positioned asymmetrically around the peripheral portions of the supporting rings and parts of the apparatus 10 positioned therebetween whereby the various parts of the apparatus 10 cannot be installed upside down and are maintained in proper alignment.

Referring now specifically to FIG. 3, the rupture member 32 is illustrated in detail. The rupture member 32 is positioned in the apparatus 10 adjacent the supporting ring 28 which is in turn positioned adjacent the flange 12 connected to the first pressure zone. The rupture member 32 is preferably flat and includes an annular flange portion 48 for sealingly coacting with a flat annular flange portion of the supporting ring 28. The flange portion 48 includes the apertures 44 through which the posts 42 described above extend. The rupture member 32 further includes a plurality of outwardly radiating slits 50, the inner ends of which terminate in apertures 52 near the center of the member 32. The outer ends of the slits 50 terminate near the annular flange portion 48 of the member 32. Elongated slots having a greater width than the slits 50 can be substituted for the slits 50 and apertures 52.

A plurality of sector-shaped openings 54 are disposed in the rupture member 32, one between each pair of adjacent slits 50. The apertures 52 positioned at the inner ends of the slits 50 or the inner ends of slots, if used, form a plurality of rupture tabs in the rupture member 32, the smallest of which controls the particular force required to cause the rupture member 32 to rupture. That is, the solid portions of the material forming the rupture member 32 between adjacent pairs of apertures 52 are referred to herein as rupture tabs, and when the rupture of the member 32 takes place, all of the rupture tabs except one tear between the apertures 52. The rupture tab of least width, i.e., of least distance between apertures 52 (designated on FIG. 3 by the letter "a") ruptures first, and therefore, the particular width of the smallest rupture tab is determinative of the force required to cause the rupture of the rupture member 32 and the pressure differential across the apparatus 10 required to cause the apparatus 10 to rupture and relieve pressure in the normal direction.

Referring now to FIG. 4, the support member 34 is illustrated in detail. The support member 34 is positioned in the apparatus 10 adjacent the rupture member 32 on the side thereof opposite the supporting ring 28. The support member 34 is also flat and includes an annular flange portion 62 for sealing contact with the annular flange portion 48 of the rupture member 32. The flange portion 62 of the member 34 contains the alignment apertures 44. In addition, an arcuate slot 60 is disposed in the member 34 interiorly of the flange portion 62 which forms a circular blowout portion 64 therein connected by a hinge portion 66 to the annular flange portion 62.

Referring now to FIG. 5, the flexible sealing member 36 is illustrated. The flexible sealing member 36 is flat and includes the alignment apertures 44 disposed in the outer annular portion thereof. While the sealing member 36 can be formed of various materials, it is preferably formed of a flexible plastic material. The sealing member 36 is positioned adjacent the support member 34 on the side thereof opposite the rupture member 32 and is adhered to the support member 34 by means of an adhesive, glue, or other means, so that the support member 34 and the sealing member 36 function as a single component part in the operation of the apparatus 10. Further, because the sealing member 36 is adhered to the support member 34, it is prevented from flexing except in the area of the arcuate slot 60 in the support member 34.

The knife member 40 is illustrated in FIG. 6 and is of one-piece construction including an annular flat flange portion 70 connected to an upstanding arcuate cutting blade 72 located about the periphery of a substantially circular opening 74 formed in the member 40. A portion of the upstanding cutting blade 72 is cut away to form a radially outwardly extending slot 76 in the member 40 corresponding in size with the hinge portion 66 of the support member 34. As illustrated in FIG. 1, the cutting blade 72 can include one or more sharp points 73 facing the sealing member 36 to institute severing of the member 36 upon contact therewith. In addition, one or more openings 75 can be formed in the flange portion of the knife member 40 for facilitating drainage of process fluids therefrom.

Figure 7:
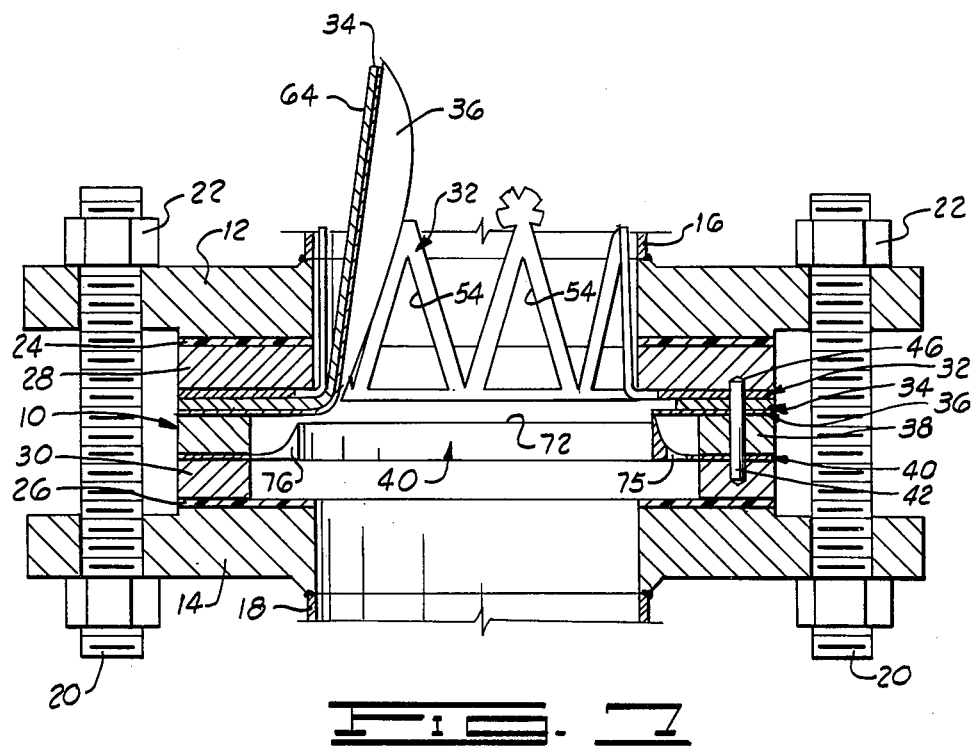
FIG. 7 is a sectional elevation view of the apparatus illustrated in FIG. 1 after rupture in the normal direction has taken place.

Referring now to FIG. 7, the apparatus 10 is illustrated after it has ruptured and relieved pressurized fluid in the normal direction, i.e., from the second pressure zone connected to the flange 14 to the first pressure zone connected to the flange 12. When the pressure differential exerted across the apparatus 10 reaches and exceeds the design rupture pressure of the apparatus 10 in the normal direction, the force exerted on the flexible sealing member 36 as a result of the pressure differential is transmitted by way of the blowout portion 64 of the support member 34 to the rupture member 32. As a result of the force exerted on the rupture member 32, the smallest rupture tab thereof tears (between the apertures 52) followed by the tearing of all but one of the remaining rupture tabs and the opening of the rupture member 32. Once the rupture member 32 ruptures and moves towards the open position, the blowout portion 64 of the support member 34 is dislocated in the same direction which causes the rupture of the sealing member 36 in the area of the arcuate slot 60 of the support member 34. As shown in FIG. 7, upon rupture the member 32 opens in petals defined by the slits 50 therein with the central portion of the rupture member defined by the apertures 52 remaining attached to one of the petals. The blowout portion 64 of the support member 34 and the portion of the sealing member 36 attached thereto bend around the hinge portion 66 of the support member 34 and are moved into the openings in the supporting ring 28 and flange 12 as shown in FIG. 7 to provide full opening of the apparatus 10 in the normal direction.

Figure 8:
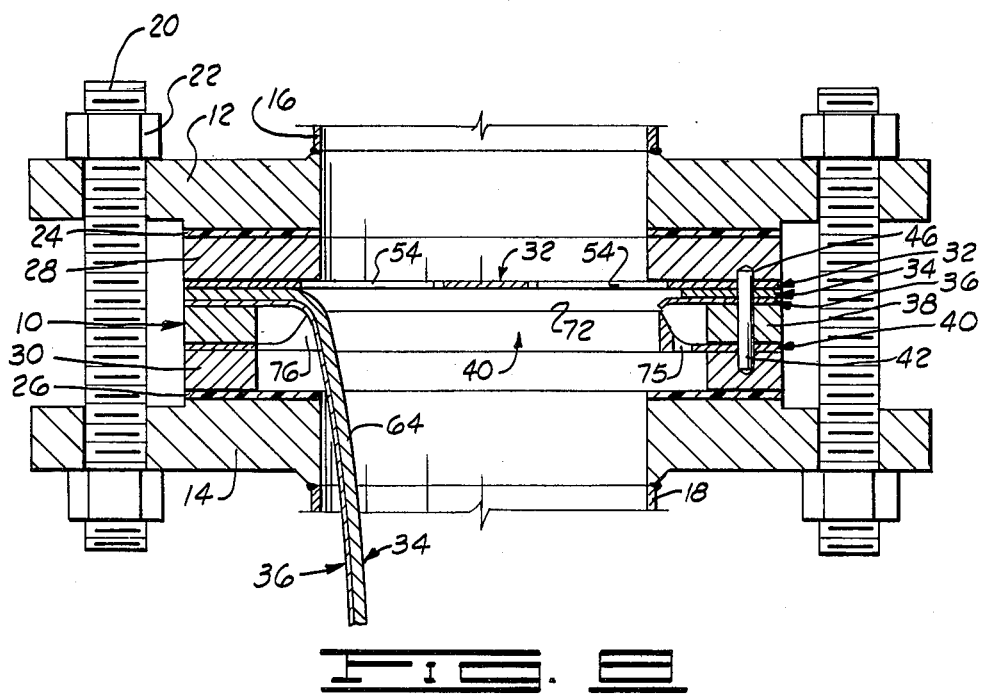
FIG. 8 is a sectional elevation view of the apparatus of FIG. 1 after rupture in the reverse direction has taken place.

Referring now to FIG. 8, the apparatus 10 is illustrated after rupture and pressure relief in the reverse direction. When the pressure differential exerted on the apparatus 10 in the reverse direction exceeds the design rupture pressure of the apparatus 10 in such direction, the force caused by the pressure differential is exerted by way of the sector-shaped openings 54 in the rupture member 32 on the blowout portion 64 of the support member 34 and the portions of the sealing member 36 exposed by the arcuate slot 60 in the support member 34. The sealing member 36 flexes in the area of the arcuate slot 60 and the blowout portion 64 as well as the portion of the sealing member 36 adhered thereto move towards the knife member 40 whereby the sealing member 36 comes into contact with the cutting blade 72 which severs the sealing member 36. Upon the severing of the sealing member 36, the blowout portion 64 of the support member 34 and the portion of the sealing member 36 adhered thereto bend around the hinge portion 66 of the support member 34 into the cutaway portion 76 in the knife member 40 as illustrated in FIG. 8 whereby the apparatus 10 is opened in the reverse direction. As indicated, the rupture member 32 remains intact when reverse direction rupture of the apparatus 10 occurs. However, because the sector-shaped openings 54 in the rupture member 32 are large, very little restriction of flow and relief of pressurized fluid through the apparatus 10 in the reverse direction occurs.

Figure 9:
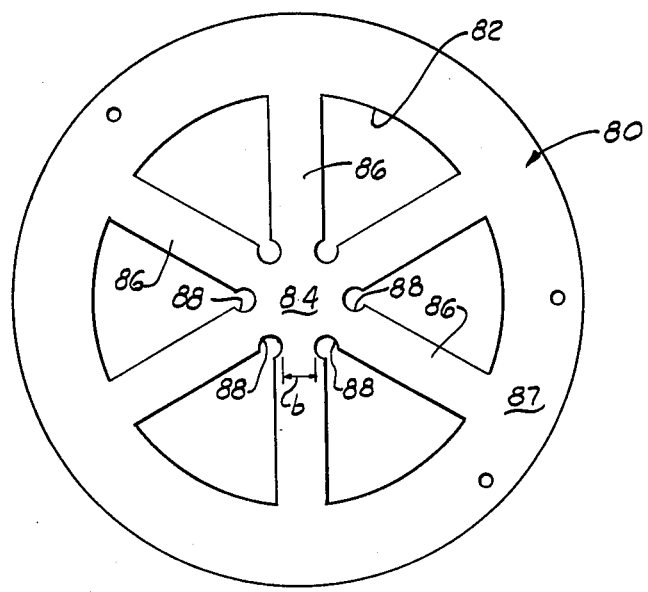
FIG. 9 is a top plan view of an alternate form of rupture member of the present invention.

Referring now to FIG. 9, an example of an alternate form of rupture member which can be used in the apparatus of the present invention is illustrated and generally designated by the numeral 80. The rupture member 80 is similar to the rupture member 32 previously described, except that instead of the slits 50 and apertures 52 disposed in the rupture member 32 or slots, the rupture member 80 includes a plurality of sector-shaped openings 82 therein forming a solid central portion 84 connected by a plurality of solid arms 86 to an annular portion 87. Each of the arms 86 includes a pair of notches 88 formed therein on opposite sides thereof adjacent the solid central portion 84 thereby forming a plurality of rupture tabs in the member 80 of widths designated by the letter "b". The rupture member 80 operates in the same manner as the rupture member 32 in that upon rupture of the smallest rupture tab all but one of the other rupture tabs tear whereby the member 80 opens with the central portion thereof attached to one of the arms 86 and the arms 86 bend in the direction of flow of pressurized fluids therethrough.

Figure 10:
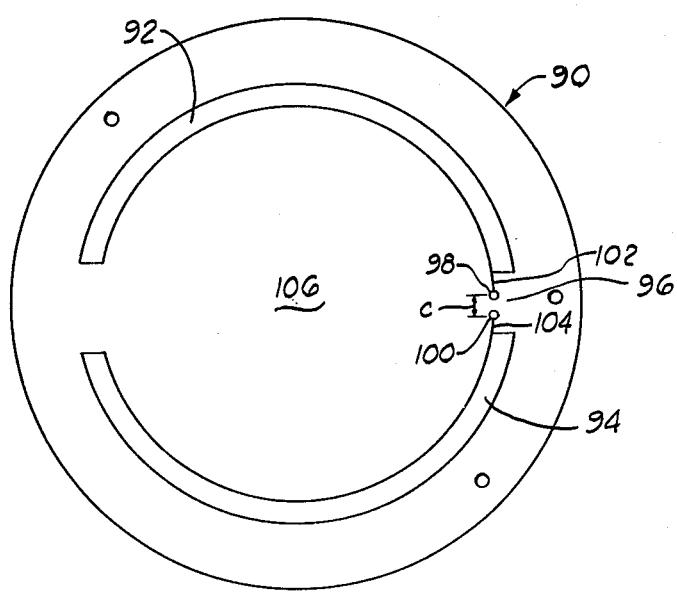
FIG. 10 is a top plan view of an alternate form of support member of the present invention.

Referring to FIG. 10, an example of an alternate form of support member including a rupture tab is illustrated and generally designated by the numeral 90. The support member 90 is similar to the support member 34 described above except that instead of a single arcuate slot, the support member 90 includes a pair of arcuate slots 92 and 94. Two of the ends of the slots 92 and 94 are positioned adjacent each other to form a rupture tab 96. If desired, the rupture tab 96 can also include a pair of spaced apart apertures 98 and 100 which are connected to the slots 92 and 94 by slits 102 and 104, respectively. In the embodiment without the apertures and slits, the distance between the adjacent ends of the slots 92 and 94 is determinative of the force required to cause the dislocation of the blowout portion 106 of the support member 90. When the slits and apertures are included in the support member 90, the distance between the apertures 98 and 100 designated by the letter "c" is determinative of the force required to cause the dislocation of the blowout portion 106.

As will be understood by those skilled in the art, various other forms of rupture member and support member can be utilized in the apparatus of the present invention without departing from the scope of this invention. The rupture member and support member are preferably formed of metal, but they can also be formed of rigid plastic or other material. As indicated previously, the flexible sealing member utilized in accordance with this invention is preferably formed of flexible plastic material, but the sealing member can also be formed of other flexible materials.

In order to facilitate a clear understanding of the apparatus of the present invention as well as the operation thereof, the following example is given.

EXAMPLE

A pressure vessel is protected from reaching an overpressure condition in excess of 150 psig. or from reaching a vacuum condition in excess of 3 inches of water column by the apparatus 10 installed in companion flanges 12 and 14. The flange 14 is connected by the conduit 18 to the vessel and the conduit 16 connected to to the flange 12 is open to the atmosphere.

The flanges 12 and 14 are 6-inch, 150 psi ASA flanges and the apparatus 10 and the component parts thereof have an outside diameter of 8.625 inches. The supporting ring 28 has an inside diameter of 6.25 inches which is approximately equal to the inside diameter of the flanges 12 and 14.

The rupture member 32 is formed of 316 stainless steel approximately 0.020 inch thick and includes six slits 50, 2.75 inches, long. The apertures 52 each have a diameter of 0.094 inch, are formed on a circle of 0.75 inch in diameter and the smallest distance between adjacent apertures 52 forming the smallest rupture tab is 0.25 inch.

The support member 34 is formed of 316 stainless steel, 0.005 inch thick and includes a single arcuate slot 0.25 inch wide, the inside surface of which coincides with a circle 6.5 inches in diameter. The hinge portion 66 of the support member 34 is 2.0 inches wide. The sealing member 36 of the apparatus 10 is formed of flexible TFE Teflon material which is 0.001 inch thick and is adhered to the support member 34 by silicone adhesive.

The knife member 40 includes an opening having a diameter of approximately 6.75 inches and the cutting blade 72 is positioned approximately 0.125 inches from the adjacent surface of the flexible sealing member 36 when a pressure differential is not applied to the apparatus.

The above described apparatus 10 will rupture in the normal direction when the pressure within the vessel being protected reaches a pressure in excess of 150 psig (plus or minus 7.5 psig) and in the reverse direction when the vessel is under a vacuum greater than 3 inches of water column (plus 5 inches W.C., minus 0" W.C.).

Thus, the apparatus of the present invention is well adapted to attain the objects and advantages mentioned as well as those inherent therein. The apparatus of the present invention includes a minimum number of flat parts and a single solid surface, i.e., a side of the sealing member 36 is exposed to the process fluid thereby making the apparatus suitable for cleaning in place. The knife member 40 is also exposed to the process fluid but because of the cutaway portion 76 and one or more openings 75 therein, process fluid will not collect and build up on the cutting member. Because of the large opening in the cutting member 40, the apparatus 10 provides maximum pressure relief flow area upon rupture in the normal direction, and because of the large sector-shaped openings in the rupture member 32, maximum pressure relief flow area is provided when the apparatus 10 ruptures in the reverse direction.

In applications where the apparatus 10 is designed to rupture in the reverse direction at a relatively high pressure differential exerted on the apparatus 10, i.e., a pressure differential greater than about 1 psi, the knife member 40 can be omitted from the apparatus 10. In the operation of this embodiment of the invention, when the pressure differential exerted on the apparatus equals or exceeds the design rupture pressure differential, the sealing member 36 tears in the areas of the one or more arcuate slots in the support member 34 without being severed by a knife blade and the blowout portion of the support member 34 as well as the portion of the sealing member 36 adhered thereto bend open as shown in FIG. 8 previously described.

While as stated above, numerous other changes in the construction and arrangement of the various parts of the apparatus of this invention can be made by those skilled in the art, such changes are included within the scope of this invention as defined by the appended claims.

What is claimed is:

1. A two-way rupturable pressure relief apparatus adapted to be clamped between a pair of complementary connection members connecting first and second pressure zones comprising:
   (a) a rupture member including a plurality of openings therein positioned with one side thereof facing the connection member connected to said first pressure zone;
   (b) a support member including one or more arcuate slots defining a circular blowout portion and a hinge portion connected to the blowout portion therein, said support member being positioned adjacent the side of said rupture member opposite the connection member connected to said first pressure zone; and
   (c) a flexible sealing member positioned adjacent the side of said support member opposite said rupture member with a side thereof facing the connection member connected to said second pressure zone, said sealing member being adhered to said support member whereby during the operation of said apparatus said support member and said sealing member function as one part and said sealing member is prevented from flexing except in the area of the one or more arcuate slots in said support member.

2. The apparatus of claim 1 which is further characterized to include a knife means for severing said sealing member positioned between said sealing member and the connection member connected to said second pressure zone, said knife means including an arcuate cutting blade of a size substantially corresponding with said one or more arcuate slots in said support member whereby an opening is provided in said knife means into which the blowout portion of the support member and the portion of the sealing member adhered therto are hingedly dislocated upon the severing of said sealing member by said cutting blade.

3. The apparatus of claim 1 wherein said rupture member includes at least one rupture tab which is determinative of the pressure differential between the second pressure zone and the first pressure zone at which the apparatus ruptures and relieves pressurized fluid therethrough from the second pressure zone to the first pressure zone.

4. The apparatus of claim 3 wherein said rupture member includes a plurality of outwardly radiating slots therein, the inner ends of said slots terminating in close proximity to each other thereby defining a plurality of rupture tabs in said member.

5. The apparatus of claim 1 wherein said support member includes at least one rupture tab which is determinative of the pressure differential between the first pressure zone and the second pressure zone at which the apparatus ruptures and relieves pressurized fluid therethrough from the first pressure zone to the second pressure zone.

6. The apparatus of claim 5 wherein said support member includes a pair of arcuate slots defining said blowout portion therein, two of the ends of said slots being positioned in close proximity to each other thereby defining said rupture tab in said support member.

7. A two-way rupturable pressure relief apparatus adapted to be clamped between a pair of complementary flanges connecting first and second pressure zones for relieving pressurized fluids from the second pressure zone to the first pressure zone when a predetermined pressure is reached in the second pressure zone and from the first pressure zone to the second pressure zone when a predetermined vacuum condition is reached in the second pressure zone comprising:
 (a) a pair of complementary supporting rings adapted to be clamped between said flanges;
 (b) a rupture member positioned between said supporting rings with one side adjacent the supporting ring facing the flange connected to said first pressure zone;
 (c) a support member including one or more arcuate slots defining a circular blowout portion and a hinge portion connected to the blowout portion therein, said support member being positioned adjacent the side of said rupture member opposite said supporting ring facing the flange connected to said first pressure zone;
 (d) a flexible sealing member positioned adjacent the side of said support member opposite said rupture member, said sealing member being adhered to said support member whereby during the operation of said apparatus said support member and said sealing member function as one part and said sealing member is prevented from flexing except in the area of the one or more arcuate slots in said support member; and A
 (e) knife means for severing said sealing member positioned between said sealing member and the supporting ring positioned adjacent the flange connected to said second pressure zone, said knife means including an arcuate cutting blade of a size substantially corresponding with said one or more arcuate slots in said support member and defining an opening in said knife means whereby upon the severing of said sealing member by said cutting blade the blowout portion of said support member and the severed portion of the sealing member adhered thereto are dislocated into the opening in said knife means while remaining hinged to said support member.

8. The apparatus of claim 7 which is further characterized to include a spacing ring positioned between said sealing member and said knife means.

9. The apparatus of claim 7 wherein said rupture member includes at least one rupture tab which is determinative of the pressure in the second zone at which the apparatus ruptures and relieves pressurized fluid therethrough from the second pressure zone to the first pressure zone.

10. The apparatus of claim 9 wherein said rupture member includes a plurality of outwardly radiating slots therein, the inner ends of said slots terminating in close proximity to each other thereby defining a plurality of rupture tabs in said rupture member.

* * * * *